(12) United States Patent
Giboney et al.

(10) Patent No.: US 6,748,139 B2
(45) Date of Patent: Jun. 8, 2004

(54) COUPLER UTILIZING A DIFFRACTIVE OPTICAL ELEMENT FOR COUPLING LIGHT TO AN OPTICAL WAVEGUIDE

(75) Inventors: Kirk S. Giboney, Santa Rosa, CA (US); Annette C. Grot, Cupertino, CA (US); Konstantinos G. Haritos, Saratoga, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 49 days.

(21) Appl. No.: 10/196,502

(22) Filed: Jul. 15, 2002

(65) Prior Publication Data

US 2004/0008936 A1 Jan. 15, 2004

(51) Int. Cl.[7] .............................. G02B 6/00; G02B 6/26; G02B 6/34
(52) U.S. Cl. ........................................ 385/37; 385/147
(58) Field of Search ............................ 385/10, 24, 31, 385/33, 37, 39, 147

(56) References Cited

U.S. PATENT DOCUMENTS

| | | | | |
|---|---|---|---|---|
| 5,475,489 A | * | 12/1995 | Gottsche | .................... 356/364 |
| 5,864,146 A | * | 1/1999 | Karellas | ...................... 250/581 |
| 6,069,853 A | * | 5/2000 | Novotny et al. | ......... 369/13.33 |
| 6,069,987 A | * | 5/2000 | Sasaki et al. | .................. 385/24 |
| 6,269,203 B1 | * | 7/2001 | Davies et al. | .................. 385/24 |

\* cited by examiner

Primary Examiner—Akm Enayet Ullah

(57) ABSTRACT

An apparatus for coupling light from a light source into an optical waveguide having an entrance aperture for receiving light to be transmitted by the waveguide. The entrance aperture has a numerical aperture that may vary over the aperture. The apparatus includes an optical element that conditions the light from the light source and a diffractive optical element. The diffractive optical element generates a plurality of light spots from the light source. The light from each light spot enters the entrance aperture of the waveguide at a different point on the entrance aperture. Each of the light spots has a numerical aperture that is less than the numerical aperture of the entrance aperture at the point on the entrance aperture at which the light from that light spots enters the entrance aperture.

11 Claims, 3 Drawing Sheets

COUPLER UTILIZING A DIFFRACTIVE OPTICAL ELEMENT FOR COUPLING LIGHT TO AN OPTICAL WAVEGUIDE

FIELD OF THE INVENTION

The present invention relates to optical coupling devices, and more particularly to a diffractive optical coupler that provides enhanced coupling efficiency.

BACKGROUND OF THE INVENTION

Optical systems in which a light source is coupled to a waveguide are common. For example, fiber optic telecommunication systems often require the coupling of lasers to single-mode fibers, and parallel optical data links, which often require coupling of lasers to waveguides such as multimode graded-index optical fibers. Maximization of the coupled optical power to the fiber is an important goal regardless of whether the waveguide is a single mode or multimode waveguide. However, coupling to multimode waveguides is more complicated as they exhibit modal noise and bandwidth characteristics that depend on the coupling mechanism.

In addition, safety considerations become important whenever an end user can be exposed to optical radiation. Eye safety is enhanced by tailoring the optical beam to have uniform intensity over a wide numerical aperture (NA), and also by reducing the required power in the beam as much as possible by minimizing coupling loss. In optical fiber systems where the optical emissions exceed established standard eye safety limits, eye protection often requires the use of open fiber control(OFC) circuitry that acts to turn off the lasers should the link be broken. This circuitry increases system cost.

Several implementations of laser-to-waveguide coupling are known to the art. These can be divided into the two basic groups, refractive and diffractive optics. Methods involving refractive optics usually incorporate a lens somewhere in the optical interface to gather the laser light and transform its NA such that the light at the input to the waveguide is captured efficiently. Unfortunately, refractive optical coupling schemes are very sensitive to any misalignment, as such misalignments are magnified by the lens. These schemes also do not perform any beam shaping, and hence do little to address eye safety.

Methods that utilize a diffractive optical element (DOE) for expanding, collimating, and/or focusing light are also known to the art. However, these schemes do not match the light to the waveguide input NA profile across the waveguide, and hence, do little to address the eye safety issues.

Broadly, it is the object of the present invention to provide an improved coupling element for coupling a light source to an optical fiber or the like.

These and other objects of the present invention will become apparent to those skilled in the art from the following detailed description of the invention and the accompanying drawings.

SUMMARY OF THE INVENTION

The present invention is an apparatus for coupling light from a light source into an optical waveguide having an entrance aperture for receiving light to be transmitted by the waveguide. The entrance aperture has a numerical aperture that may vary over the aperture. The apparatus includes an optical element for conditioning the light from the source and a diffractive optical element. Conditioning elements that collimate the beam or generate diverging or converging beams may be utilized. The diffractive optical element generates a plurality of light spots from the light source. The light from each light spot enters the entrance aperture of the waveguide at a different point on the entrance aperture. Each of the light spots has a numerical aperture that is less than the numerical aperture of the entrance aperture at the point on the entrance aperture at which the light from that light spot enters the entrance aperture. The optical conditioning element may be part of the diffractive optical element or separate therefrom. The apparatus may be constructed from a single optical element through which the light passes by stamping or molding the diffractive optical element into a surface of the optical element.

DETAILED DESCRIPTION OF THE INVENTION

The present invention utilizes a DOE to generate an array of images of a light source such as a laser and project those images onto the surface of an optical waveguide having a refractive index that varies over the surface. The individual images have different NAs and/or powers that are chosen such that the image has a NA within the acceptance cone of the waveguide at the point on the surface of the waveguide at which the image is received. This arrangement provides improved coupling efficiency, and hence, the power required from the source is reduced. In addition, the present invention produces a broad, uniform beam in the far field, further increasing eye safety.

Figure 1:
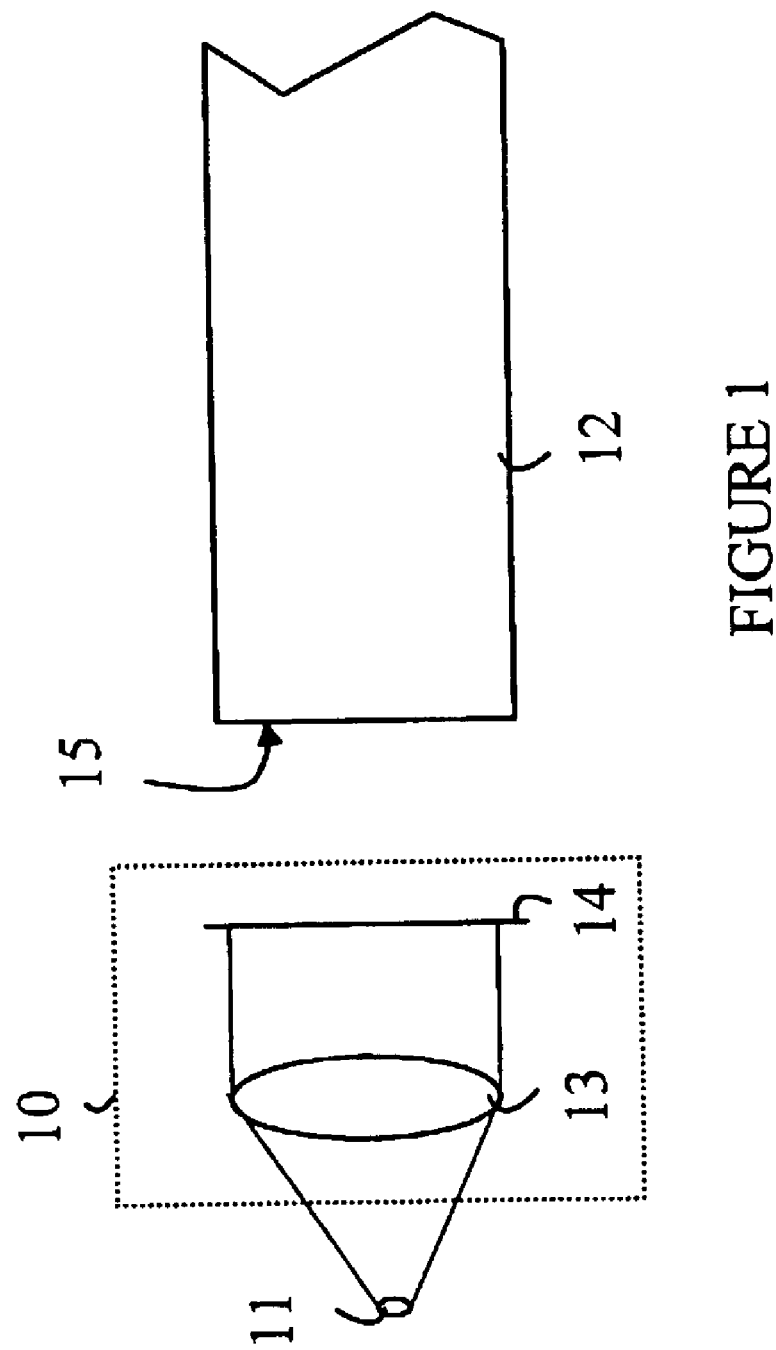
FIG. 1 is a side view of a coupler 10 that couples light from a laser 11 into an optical fiber 12 according to the present invention.
Figure 2:
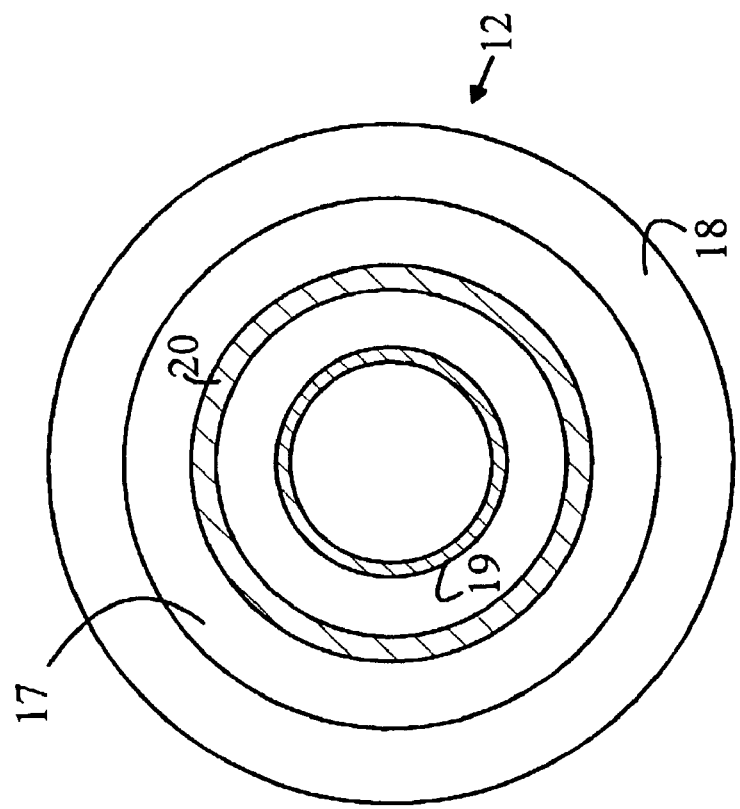
FIG. 2 is a front view of the end 15 of fiber 12.

The manner in which the present invention provides its advantages can be more easily understood with reference to FIGS. 1 and 2. FIG. 1 is a side view of a coupler 10 that couples light from a laser 11 into an optical fiber 12 according to the present invention. FIG. 2 is a front view of the end 15 of fiber 12. Coupler 10 includes a collimating lens 13 that collimates the light from laser 11 onto DOE 14. DOE 14 generates an array of spots that are projected on fiber 15. In the preferred embodiment of the present invention, the spots are rings of light as shown at 19 and 20 in FIG. 2.

Fiber 12 is assumed to have a core region 17 and a cladding region 18. To simplify the following discussion, it will be assumed that the waveguide is a graded-index fiber that has a refractive index that varies radially as shown below:

$$n(r) = \begin{cases} n_{max}[1 - (r/a)^\alpha \Delta] & \text{for } r < a \text{ (fiber core)} \\ n_{max}(1 - \Delta) \equiv n_{cladding} & \text{for } r > a \text{ (fiber cladding)} \end{cases}$$

For a typical graded-index fiber with a cored diameter of 62.5 microns and a cladding diameter of 125 microns, $n_{max}$ is typically ~1.47, $\Delta$~0.18, and $\alpha$~2. In this case, the radially dependent NA of the fiber is given by $$NA(r) = \sqrt{n^2(r) - n^2 cladding}$$

Accordingly, the DOE is designed to generate an array of spots such that each spot's NA is less than the fiber NA at the radius on the fiber at which the spot is projected on the fiber face. In the preferred embodiment of the present invention, the generated array is restricted to a maximum radius that is determined by the alignment tolerance to avoid any aperturing at the fiber face.

The embodiment of the present invention shown in FIG. 1 utilizes a collimating lens. However, it should be noted that the collimation can be performed within the DOE; hence, the lens can be eliminated by utilizing a more complex DOE.

In addition, it should be noted that the incident beam need not include a collimator, as other forms of beam conditioning can also be utilized to illuminate the DOE in a manner that results in the desired spot pattern. For example, a converging illumination of the DOE has the advantage of reducing the focal power required in the DOE. A DOE that operates with a diverging input beam can also be constructed.

The above-described embodiments of the present invention depend on a DOE that generates an array of spots from the source having a particular geometric relationship. The generation of a uniform array of spots is known to the art. For example, J. Hoch, A. Grot, T. S. Tan and J. Kahn, "Diffractive Spot-Array Generation Using Multimode Surface-Emitting Lasers and Light-Emitting Diopdes," in *Difractive Optics and Micro-Optics*, Vol. 5, 1996 OSA Technical Digest Series (Optical Society of America, Washington, D.C., 1996), pp. 71–74, teaches such a DOE. In the DOE taught by Hoch, the collimating lens determines the size of each generated image, while the DOE determines the shape and spacing of the generated array.

It should be noted that the specific modes of the fiber that carry light are determined by the positions of the spots on the face of the fiber and the angles at which the light strikes the face of the fiber. Hence, the present invention may be utilized to "launch" only into selected waveguide modes. The locations of the rings and the angle of incidence of the light in each ring are determined by the DOE and the distance between the DOE and the end of the fiber. Hence, by correctly designing the DOE pattern, the groups of modes that are launched can be selected, and the bandwidth of a data link can be increased for certain types of light sources.

The DOE will typically include a series of concentric rings. The rings preferably all have the same width, typically of the order of one micron. The depth of the rings varies from ring to ring. The depth as a function of radius, together with the distance from the DOE to the fiber end, is chosen to set the spot location on the fiber entrance and the angles of incidence of the light entering the fiber.

Many optical links utilize arrays of surface-emitting lasers. Such links often require that the light path between each of the lasers and the corresponding waveguide include a 90-degree bend between the substrate having the laser and the waveguide. The present invention can provide such a bend.

Figure 3:
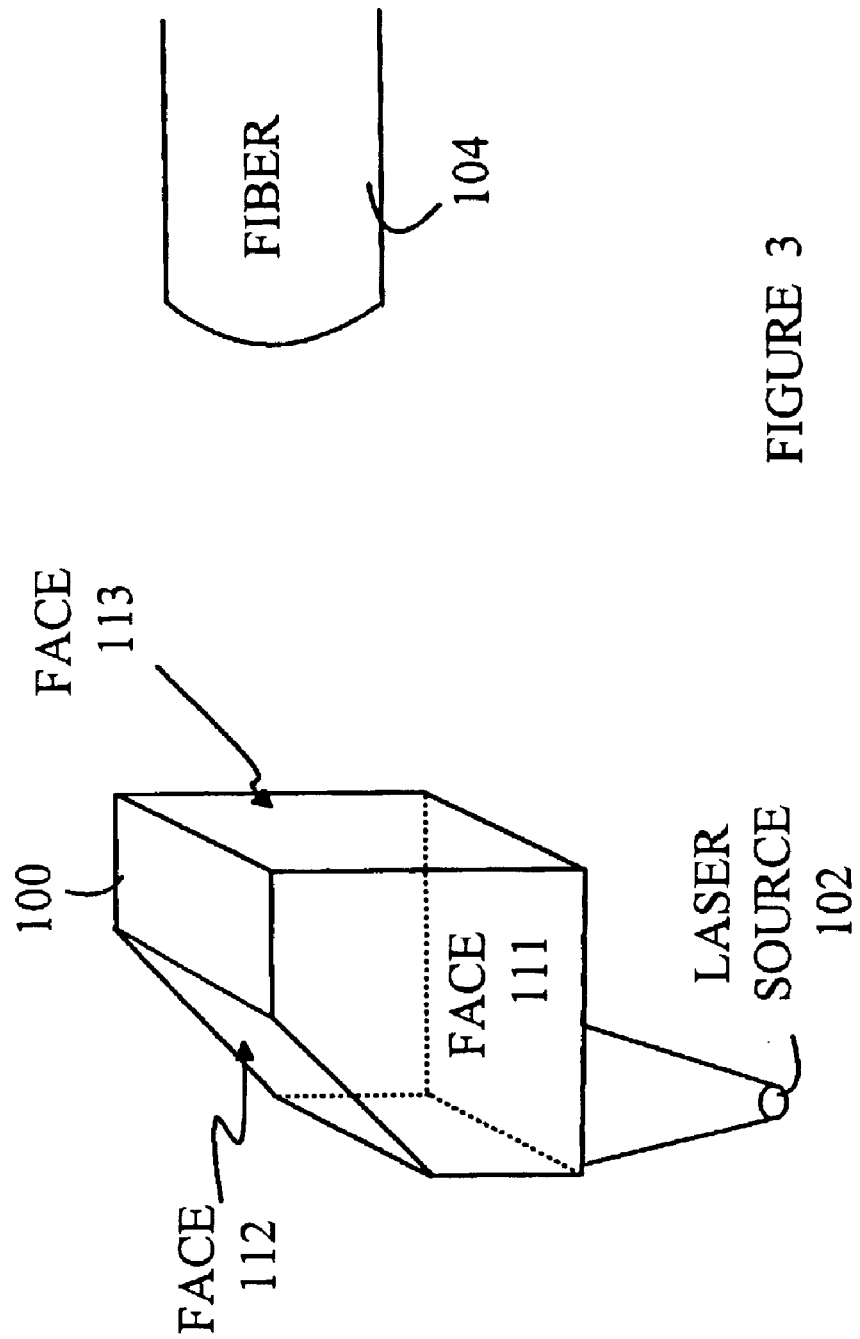
FIG. 3 is a prospective view of an interface 100 according to the present invention that incorporates a 90-degree bend.

Refer now to FIG. 3, which is a prospective view of an interface 100 according to the present invention that incorporates a 90-degree bend. Interface 100 interfaces a laser source 102 to a fiber 104. Interface 100 can be made from one piece of transparent material such as plastic or glass by forming the interface in a suitable mold. A lens element to collimate the light is included in face 111. Face 112 can be either a total internal reflection mirror or a reflective array-generating DOE. If face 112 is a mirror, then a transmissive array-generating DOE is placed on face 113 by stamping or molding.

Various modifications to the present invention will become apparent to those skilled in the art from the foregoing description and accompanying drawings. Accordingly, the present invention is to be limited solely by the scope of the following claims.

What is claimed is:

1. An apparatus for coupling light from a light source into an optical waveguide having an entrance aperture for receiving light to be transmitted by said waveguide, said entrance aperture having a numerical aperture, said apparatus comprising:

an optical element for conditioning said light;

a diffractive optical element for generating a plurality of light spots from said light source, light from said light spots entering said entrance aperture of said waveguide at different points on said entrance aperture, each of said light spots having a numerical aperture that is less than the numerical aperture of said entrance aperture at said point on said entrance aperture at which said light from that light spot enters said entrance aperture.

2. The apparatus of claim 1 wherein said conditioning optical element comprises a collimator.

3. The apparatus of claim 1 wherein said conditioning optical element generates a converging light beam.

4. The apparatus of claim 1 wherein said conditioning optical element generates a diverging light beam.

5. The apparatus of claim 1 wherein said optical waveguide comprises an optical fiber and wherein said numerical apertures of said light spots vary radially with respect to the center of said optical fiber.

6. The apparatus of claim 1 wherein said collimator is part of said diffractive optical element.

7. The apparatus of claim 1 wherein said diffractive optical element comprises a surface of an optical element through which light from said light source must pass before entering said entrance aperture.

8. The apparatus of claim 7 wherein said diffractive optical element comprises a reflective surface of said optical element.

9. The apparatus of claim 7 wherein said diffractive optical element comprises a transmissive surface of said optical element.

10. The apparatus of claim 7 wherein light leaving said light source is bent through 90 degrees by said optical element prior to said light entering said entrance aperture.

11. The apparatus of claim 7 wherein said collimator comprises a surface of said optical element.

* * * * *